United States Patent
Johnson et al.

(10) Patent No.: US 11,451,489 B2
(45) Date of Patent: *Sep. 20, 2022

(54) WIRELESS ACCESS GATEWAY

(71) Applicant: British Telecommunications Public Limited Company, London (GB)

(72) Inventors: Stephen Johnson, London (GB); Francis Scahill, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/121,695

(22) PCT Filed: Feb. 24, 2015

(86) PCT No.: PCT/GB2015/050515
§ 371 (c)(1),
(2) Date: Aug. 25, 2016

(87) PCT Pub. No.: WO2015/136239
PCT Pub. Date: Sep. 17, 2015

(65) Prior Publication Data
US 2017/0041247 A1 Feb. 9, 2017

(30) Foreign Application Priority Data
Mar. 12, 2014 (EP) .................... 14250039

(51) Int. Cl.
*H04L 12/911* (2013.01)
*H04W 88/16* (2009.01)
(Continued)

(52) U.S. Cl.
CPC ........ *H04L 47/825* (2013.01); *H04L 61/2592* (2013.01); *H04W 8/04* (2013.01); *H04W 88/16* (2013.01); *H04W 88/02* (2013.01)

(58) Field of Classification Search
CPC ... H04L 47/825; H04L 61/2592; H04L 47/14; H04W 88/02; H04W 88/16
See application file for complete search history.

(56) References Cited

U.S. PATENT DOCUMENTS 8,279,776 B1 10/2012 Everson et al.
8,379,528 B1 2/2013 Xue et al.
(Continued)

FOREIGN PATENT DOCUMENTS

CN 1756209 A 4/2006
CN 101836468 A 9/2010
(Continued)

OTHER PUBLICATIONS

Gotchev et al., "SP WiFi Packet Core Integration," Cisco (Mar. 21, 2012), retrieved online on Jul. 11, 2014 at http://www.cisco.com/assets/global/YU/expo2012/pdfs/sp_wifi_sesija_1_core.pdf; 39 pages. XP02727066.
(Continued)

*Primary Examiner* — Ajit Patel
(74) *Attorney, Agent, or Firm* — Patterson Thuente IP

(57) ABSTRACT

A wireless network including a wireless access gateway (WAG) and methods are provided for routing traffic between non-cellular and cellular networks. The WAG interconnects at least one non-cellular network and at least one cellular network in an at least one-to-many relationship. The WAG receives a first IP address for the UE in the cellular domain and the WAG allocates a second IP address for the UE in the non-cellular domain. The WAG creates a routing rule including the first and second IP addresses for the UE and an additional data path identifier.

22 Claims, 6 Drawing Sheets

(51) Int. Cl.

| | | |
|---|---|---|
| *H04L 12/801* | (2013.01) | |
| *H04L 29/12* | (2006.01) | |
| *H04W 88/02* | (2009.01) | |
| *H04L 47/70* | (2022.01) | |
| *H04W 8/04* | (2009.01) | |
| *H04L 61/2592* | (2022.01) | |

(56) References Cited

U.S. PATENT DOCUMENTS

| | | | |
|---|---|---|---|
| 8,892,724 | B1 | 11/2014 | Bertz |
| 9,100,940 | B2 | 8/2015 | Centemeri et al. |
| 9,445,256 | B1 | 9/2016 | Cole et al. |
| 2004/0028009 | A1* | 2/2004 | Dorenbosch ...... H04W 36/0011 370/329 |
| 2005/0025164 | A1* | 2/2005 | Kavanagh ......... H04W 36/0033 370/401 |
| 2010/0182910 | A1* | 7/2010 | Norefors ................. H04W 4/02 370/241 |
| 2010/0246509 | A1 | 9/2010 | Chen |
| 2010/0322163 | A1* | 12/2010 | Bhalla ............... H04W 36/0066 370/329 |
| 2011/0004758 | A1* | 1/2011 | Walker ................. H04L 63/062 713/168 |
| 2011/0199987 | A1 | 8/2011 | Rommer |
| 2012/0117251 | A1 | 5/2012 | Zhou |
| 2013/0005332 | A1 | 1/2013 | Sedlacek |
| 2013/0070745 | A1 | 3/2013 | Nixon et al. |
| 2013/0097674 | A1 | 4/2013 | Gindal et al. |
| 2013/0155851 | A1* | 6/2013 | Koodli ................. H04L 45/308 370/230 |
| 2013/0223421 | A1 | 8/2013 | Gundavelli et al. |
| 2013/0288644 | A1 | 10/2013 | Schroeder |
| 2014/0052860 | A1 | 2/2014 | Duggal |
| 2014/0129839 | A1* | 5/2014 | So ....................... H04L 61/2514 713/171 |
| 2014/0269551 | A1 | 9/2014 | Henderickx et al. |
| 2015/0003415 | A1* | 1/2015 | Muley ............... H04W 36/0022 370/331 |
| 2015/0188949 | A1* | 7/2015 | Mahaffey ................. H04L 63/20 726/1 |
| 2016/0345230 | A1 | 11/2016 | Cuevas Ramirez et al. |
| 2016/0380962 | A1 | 12/2016 | Johnson et al. |

FOREIGN PATENT DOCUMENTS

| | | |
|---|---|---|
| CN | 101867987 A | 10/2010 |
| CN | 102006676 A | 4/2011 |
| CN | 103179621 A | 6/2013 |
| EP | 2 597 925 A1 | 5/2013 |
| WO | WO 2012/175544 A1 | 12/2012 |
| WO | WO 2013/070540 A1 | 5/2013 |

OTHER PUBLICATIONS

"3$^{rd}$ Generation Partnership Project; Technical Specification Group Services and System Aspects; 3GPP system to Wireless Local Area Network (WLAN) interworking; System description (Release 11)," 3GPP Standard; 3GPP TS 23.234, 3$^{rd}$ Generation Partnership Project (3GPP), Mobile Competence Centre; 650 Route des LUcioles; F-06921 Sophia-Antipolis Cedex, France; vol. SA WG2, No. V11.0.0, 17 (Sep. 17, 2012); pp. 1-84. XP050649114.

International Search Report for corresponding International Application No. PCT/GB2015/050515 dated May 12, 2015; 4 pages.

Written Opinion for corresponding International Application No. PCT/GB2015/050515 dated May 12, 2015; 7 pages.

3GPP TS 23.402, 3$^{rd}$ Generation Partnership Project; Technical Specification Group Services and System Aspects; Architecture Enhancements for Non-3GPP Accesses (Release 12), V. 12.3.0 (Dec. 2013), 288 pages.

3GPP TS 23.234, 3$^{rd}$ Generation Partnership Project; Technical Specification Group Services and System Aspects; 3GPP System to Wireless Local Area Network (WLAN) Interworking; System Description (Release 11), V. 11.0.0 (Sep. 2012), 84 pages.

European search report, Application No. 14250039.6, dated Jul. 30, 2014, 6 pages.

Gotchev, Sergei, Cisco, *SP WiFi Packet Core Integration*, (c) 2011, 39 pages.

Cisco, *Architecture for Mobile Data Offload over WiFi Access Networks*, (c) 2012, 23 pages.

Alcatel Lucent, LightRadio WiFi WLAN Gateway, *Evolution of the Alcatel-Lucent 7750 Service Router to Support WLAN Gateway Functionality*, (c) 2013, 14 pages.

Ruckus, Integrating WiFi RANs into the Mobile Packet Core, Enabling the Vision of Heterogeneous Networking through the Convergence of Wi-Fi and 3G/LTE Technology, (c) 2014, 5 pages.

English Translation of Chinese Office Action, Application No. 201580013297.8, dated Aug. 12, 2019, 8 pages.

Chinese Search Report, Application No. 201580013297.8, , dated Aug. 12, 2019, 3 pages.

Application and File History for U.S. Appl. No. 15/121,717, filed Aug. 25, 2016. Inventors: Johnson et al.

802.11i™, "IEEE Standard for Information Technology—Telecommunications and Information Exchange Between Systems—Local and Metropolitan Area Networks—Specific Requirements," IEEE Computer Society, Jul. 23, 2004, 190 pages.

International Preliminary Report on Patentability for Application No. PCT/GB2015/050515, dated Sep. 22, 2016, 9 pages.

International Preliminary Report on Patentability for Application No. PCT/GB2015/050519, dated Feb. 11, 2016, 14 pages.

International Search Report for Application No. PCT/GB2015/050519, dated Apr. 2, 2015, 4 pages.

Office Action dated Feb. 2, 2018 for Chinese Application No. 201580012692.4 filed Feb. 24, 2015, 2 pages. (English translation only).

Written Opinion for Application No. PCT/GB2015/050519, dated Apr. 2, 2015, 7 pages.

* cited by examiner

WIRELESS ACCESS GATEWAY

CROSS-REFERENCE TO RELATED APPLICATIONS

The present application is a National Phase entry of PCT Application No. PCT/GB2015/050515, filed on 24 Feb. 2015, which claims priority to EP Patent Application No. 14250039.6, filed on 12 Mar. 2014, which are hereby fully incorporated herein by reference.

TECHNICAL FIELD

The present disclosure relates to a wireless network including a wireless access gateway and a method for controlling traffic roaming between cellular and non-cellular networks.

BACKGROUND

In recent years, it has become increasingly desirable for Mobile Network Operators (MNOs) to integrate their cellular and non-cellular (e.g. Wi-Fi) networks. This provides a mechanism for the MNO to both offload cellular data traffic onto a Wi-Fi network having a wired data connection (which is generally more suited to high data demands) and "onload" traffic seamlessly back onto the cellular network. Accordingly, modern cellular technologies, such as the $3^{rd}$ Generation Partnership Project (3GPP) LTE networks, have evolved to include a tight integration between the cellular and non-cellular networks, such that handovers between the two networks are correctly authenticated and maintain consistent policy and charging control.

4G network standards provide a framework for interconnecting the non-cellular (commonly known as "non-3GPP") network and the Evolved Packet Core, EPC, through the trusted and untrusted access specification (as specified in 3GPP Technical Specification 23.402 Release 12 Architectural Enhancements for Non-3GPP Access). The standards do not strictly define when a non-3GPP network is trusted or not (this is at the discretion of the MNO), but they do define how the MNO must treat the traffic—the principle difference being that untrusted non-3GPP connections must include an IPSec tunnel between the User Equipment, UE, and the EPC. For trusted networks, communication between the UE and EPC is considered secure (e.g. by using SIM based authentication with the UE and WPA2 IEEE 802.11i-2004 security in the Wi-Fi Access network).

Most of today's networks (e.g. 2G and 3G networks) predate the 4G standards. However, it is still desirable for MNOs to integrate the non-3GPP and pre-4G cellular networks. To make this possible, a Wireless Access Gateway (WAG) is used to interconnect the two networks. The WAG connects to the cellular network using the GPRS Tunneling Protocol, GTP, connecting directly to a Gateway GPRS Support Node, GGSN. However, the data connection between the WAG and the non-3GPP network is not standardized. Accordingly, a variety of methods for routing user plane data from a non-3GPP network to the cellular network have been used. These existing methods can be grouped into Layer 2 or Layer 3 integration. Layer 2 integration can be complicated to implement, requiring the WAG to become part of the Wireless Access Network. This increases the cost of deployment for a Wi-Fi Network operator. Thus, the distributed architecture of Layer 3 integration (in which the WAG is a separate component in the network) is more desirable.

In Layer 3 integration, the user plane IP traffic is routed from the Wi-Fi Network's Wireless LAN Controller (WLC) to the WAG, and then from the WAG to the cellular network. The key issue with the Layer 3 approach is associating the IP address for the UE in the non-3GPP network with the IP address for the UE in the cellular network. There are several techniques, including the following two examples. Firstly, the 'Radius Framed-IP-Address' technique involves the AP allocating an IP address for a User Equipment, UE, and subsequently informing the WAG of this IP address using the RADIUS signaling message. Secondly, the 'DHCP Relay' technique involves the DHCP request message issued by the WAG being 'relayed' to the WAG, and the WAG issuing the IP address for the UE. The WAG may then set up the appropriate routing rules with the IP address in the cellular network.

The Cisco enhanced Wireless Access Gateway (eWAG) is an example of a Layer 3 integration of the WAG. An example of the eWAG can be found at the following URL: http://www.cisco.com/assets/global/YU/expo2012/pdfs/sp_wifi_sesija_1_core.pdf. In the Cisco system, an Access Point allocates the IP address in the Wi-Fi domain for the UE, and supplies this IP address to the eWAG as part of the Framed-IP-Address element of the RADIUS Accounting Start message. The MNO supplies the IP address in the cellular domain, and the eWAG sets up the appropriate routing rules.

The present inventors have identified several problems with the existing techniques. Firstly, the 3GPP standards specify that the MNO must allocate the IP address for the UE, which is then routed to the corresponding IP address for the UE in the non-3GPP domain by the WAG. However, if the WAG is connected to multiple MNOs, the MNOs may issue the same IP address for the same UE. This creates an issue when the WAG routes IP traffic from the UE to the cellular network, as it cannot differentiate between the two MNOs for that IP address. Secondly, the IP address issued to the UE in the non-3GPP domain may conflict with an IP address for another UE connected to the AP. This may happen, for example, when the IP address in the non-3GPP domain is issued by the WAG. This IP address conflict will create an issue when the WAG routes IP traffic to the UE in the non-3GPP domain, as the same IP address is associated with two UEs.

Furthermore, the prior art techniques provide a method of setting up a data path between the UE and cellular data network, but this data path must be torn down if the UE roams out of the non-3GPP network (e.g. onto a distinct non-3GPP network). Thus, IP address sensitive applications cannot continue to function when the UE roams between non-3GPP networks.

It is therefore desirable to alleviate some or all of the above problems.

SUMMARY

According to a first aspect of the disclosure, there is provided a method of controlling a wireless access gateway (WAG) the WAG interconnecting at least one non-cellular network and at least one cellular network in an at least one-to-many relationship, the method comprising: a WAG receiving a first IP address for a User Equipment (UE) from a first cellular network; the WAG allocating a second IP address for the UE and sending the second IP address to a first non-cellular network; and the WAG defining a routing rule including the first and second IP addresses for the UE and a data path identifier.

Thus, in a scenario in which a WAG interconnects several cellular networks to one non-cellular network and the several cellular networks allocate the same IP address to different UEs, the WAG may use the data path identifier to distinguish between the different data paths. This allows the WAG to be used as a gateway between networks owned by several distinct operators.

The data path identifier may be a first cellular network identifier. The data path identifier may also be a UE IMSI, GTP tunnel endpoint IDs or any other unique UE identifier.

The method may further comprise the WAG receiving a GPRS Tunneling Protocol (GTP) request message from the first non-cellular network before the step of the WAG receiving a first IP address for the UE. The method may also comprise the step of establishing a GTP tunnel between the WAG and the first non-cellular network. Accordingly, the WAG may establish GTP tunnels between the WAG and the non-cellular network and between the WAG and cellular networks. The WAG may therefore be compatible with GTP enabled Wi-Fi equipment.

The method may further comprise, initially, the WAG sending an authentication message for the UE to the first cellular network; and the WAG receiving an authentication vector for the UE from the first cellular network. The WAG may receive a plurality of authentication vectors (for example, up to five authentication vectors), which may be stored in memory.

The WAG may allocate the second IP address for the UE from a dedicated pool of IP addresses for the first non-cellular network. Thus, the non-3GPP network (e.g. a Wi-Fi network) may define a first range of IP addresses to be used for roaming devices and a second range of IP addresses to be used for non-roaming devices, and the WAG may use the first range as the pool of IP addresses dedicated to the non-3GPP network. Accordingly, the WAG can allocate an IP address which will not conflict with a non-roaming device. The WAG may then define a routing rule including the first and second IP addresses for the UE and subsequently route traffic according to this rule.

The WAG may interconnect a plurality of non-cellular networks to a cellular network, and the method may further comprise: the WAG allocating a third IP address for the UE, the third IP address allocated from an IP address range dedicated to a second non-cellular network; the WAG sending the third IP address to the second non-cellular network; and the WAG updating the routing rule to indicate the first and third IP addresses for the UE. Accordingly, in a scenario in which a UE roams between two non-cellular networks, the WAG may act as a mobility anchor. That is, the WAG may maintain the GTP tunnel with the cellular network whilst a new IP address is issued for the UE in the new non-cellular network and the routing rule may be updated to reflect the new data path. Any IP address sensitive applications on the UE may therefore continue to operate whilst the UE roams between the two non-cellular networks.

The WAG may use a stored authentication vector for the UE to authenticate the UE. Thus, the WAG does not need to exchange authentication messages with the cellular network when the UE roams between the two non-cellular networks.

A computer program is provided containing computer-executable code which, when executed on a computer, causes the computer to perform the method of the first aspect of the disclosure.

According to a second aspect of the disclosure, there is provided a device adapted to interconnect at least one non-cellular network and at least one cellular network in an at least one-to-many relationship, the device comprising a communications interface adapted to receive a first IP address for a User Equipment (UE) from a first cellular network; and a processor adapted to allocate a second IP address for the UE, wherein the communications interface is further adapted to send the second IP address to the first non-cellular network, and the processor is further adapted to create a routing rule including the first and second IP addresses for the UE and an additional data path identifier.

The communications interface may be further adapted to receive a GPRS Tunneling Protocol (GTP) request message from the first non-cellular network, and the processor may be further adapted to establish a GTP tunnel with the first non-cellular network.

The communications interface may be further adapted to send an authentication message for the UE to the first cellular network and to receive an authentication vector for the UE from the first cellular network.

The processor may be adapted to allocate the first IP address for the UE from an IP address range dedicated to the first non-cellular network.

The device may be adapted to interconnect a plurality of non-cellular networks to a cellular network, wherein the processor may be further adapted to allocate a third IP address for the UE, the third IP address allocated from an IP address range dedicated to a second non-cellular network, the communications interface may be further adapted to send the third IP address to the second non-cellular network, and the processor may be further adapted to update the routing rule to include the first and third IP addresses for the UE. The communications interface may use the stored authentication vector for the UE to authenticate the UE.

The device may further comprise a NAT, wherein the processor may be further adapted to update the NAT with the routing and translation rule and the NAT may be adapted to route and translate traffic according to the routing and translation rules.

A wireless network including the device is also provided. The device may be a dedicated Wireless Access Gateway or may be integrated into another element in the wireless network.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
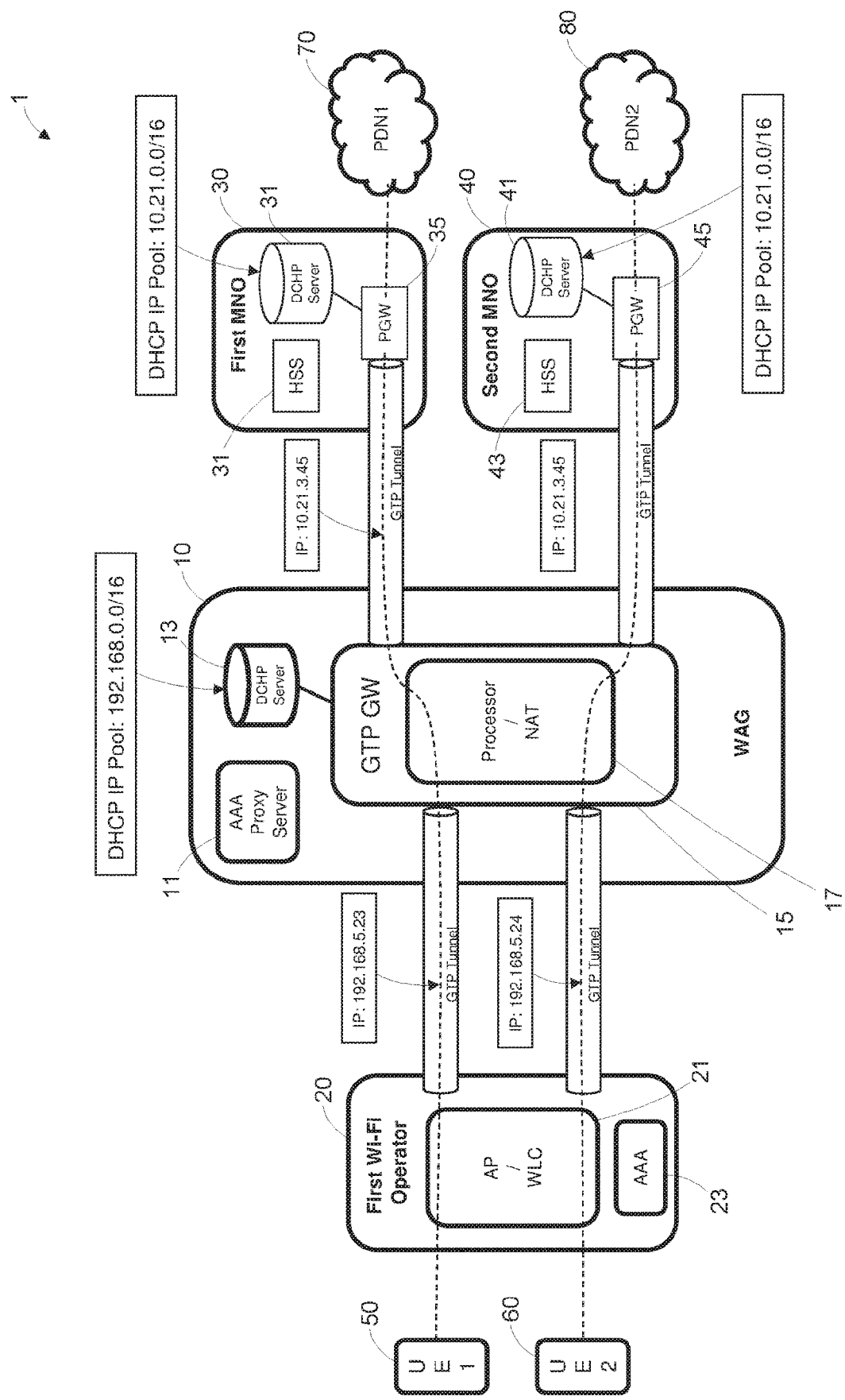
FIG. 1 is a schematic diagram illustrating a wireless network of a first embodiment.

A first embodiment of the present disclosure will now be described with reference to FIGS. 1 and 3. FIG. 1 illustrates a wireless network 1 including a Wireless Access Gateway (WAG) 10, a first Wi-Fi operator 20, first and second Mobile Network Operators (MNOs) 30, 40, and a first and second UE 50, 60. The WAG 10 interconnects the first Wi-Fi operator 20 and the first and second MNOs 30, 40.

The WAG 10 includes an Authentication, Authorization and Accounting, AAA, proxy server 11, a DCHP server 13 and a GPRS Gateway (GTP GW) 15 (including a Network Address Translation, NAT, module 17). The WAG 10 also includes a first communications interface adapted to communicate with the Wi-Fi operator 20, and a second communications interface adapted to communicate with the first and/or second MNO 30, 40.

The first Wi-Fi operator 20 includes an Access Point 21 and an Authentication, Authorization and Accounting, AAA, server 23. The Access Point 21 includes an antenna adapted to communicate with the first and second UE and a Wireless LAN controller (WLC). The Access Point 21 also has a fixed data connection (such as a DSL data connection), which may be used to communicate with the WAG 10.

The first and second MNO 30, 40 also include first and second DHCP servers 31, 41, first and second Home Subscriber Services, HSS 33, 43, and first and second Packet Data Network Gateways (PGWs) 35, 45. The first and second PDWs 35, 45 connect the MNOs 30, 40 to a first and second Pack Data Network (PDN) 70, 80, such as the Internet. The first and second MNOs 30, 40 also include first and second communications interfaces respectively, adapted to communicate with the WAG 10.

The first UE 50 is associated with the first MNO 30 and has roamed onto the first Wi-Fi operator's 20 network. The second UE 60 is associated with the second MNO 40 and has also roamed onto the first Wi-Fi operator's 20 network. The WAG 10 is configured to set up a first and second data path, between the first UE and first MNO and between the second UE and the second MNO, respectively. This may be implemented by a method of the first embodiment, which will now be described in more detail with reference to FIGS. 2 and 3.

Figure 2:
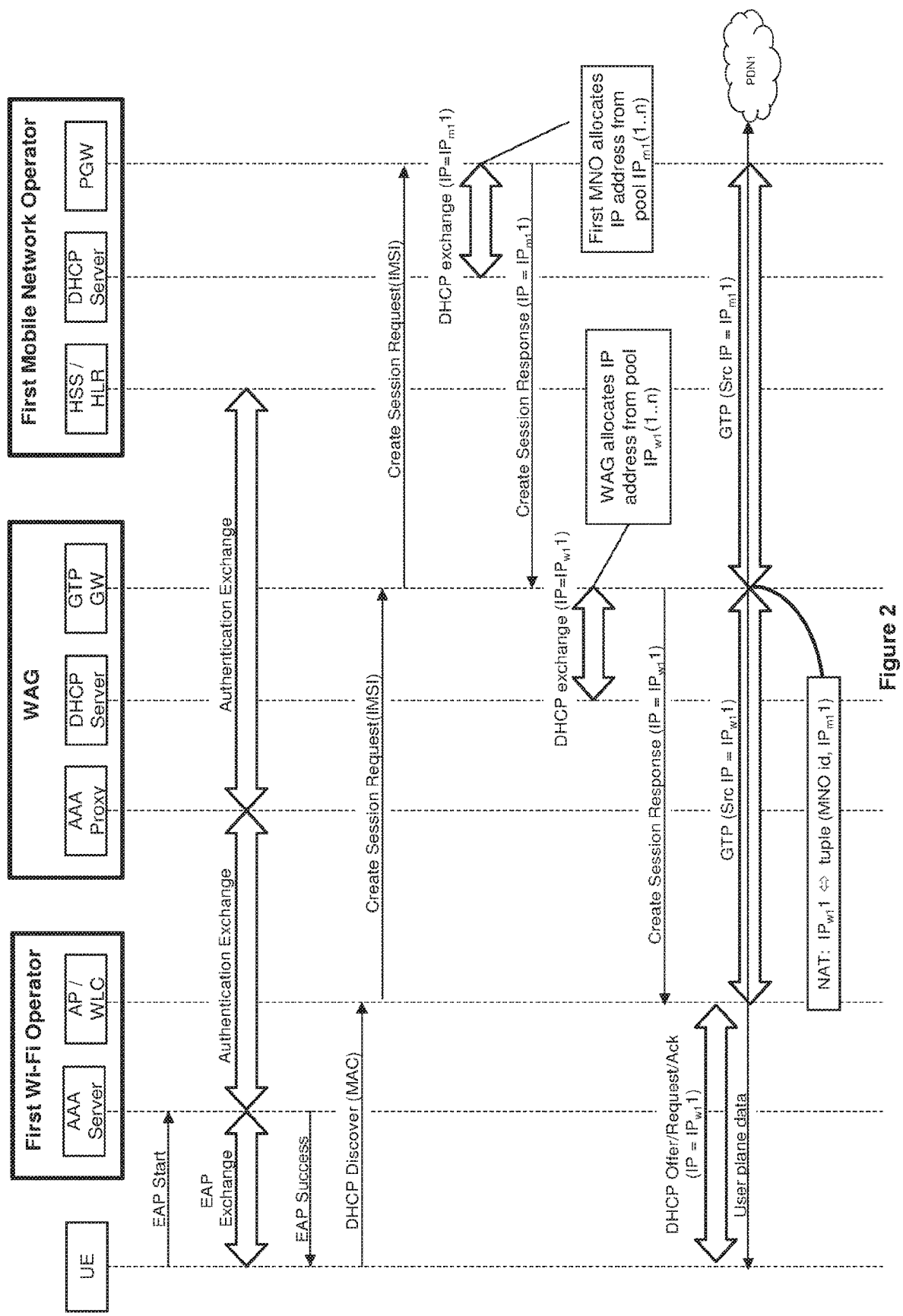
FIG. 2 is a diagram illustrating a message flow between elements of the wireless network of FIG. 1.
Figure 3:
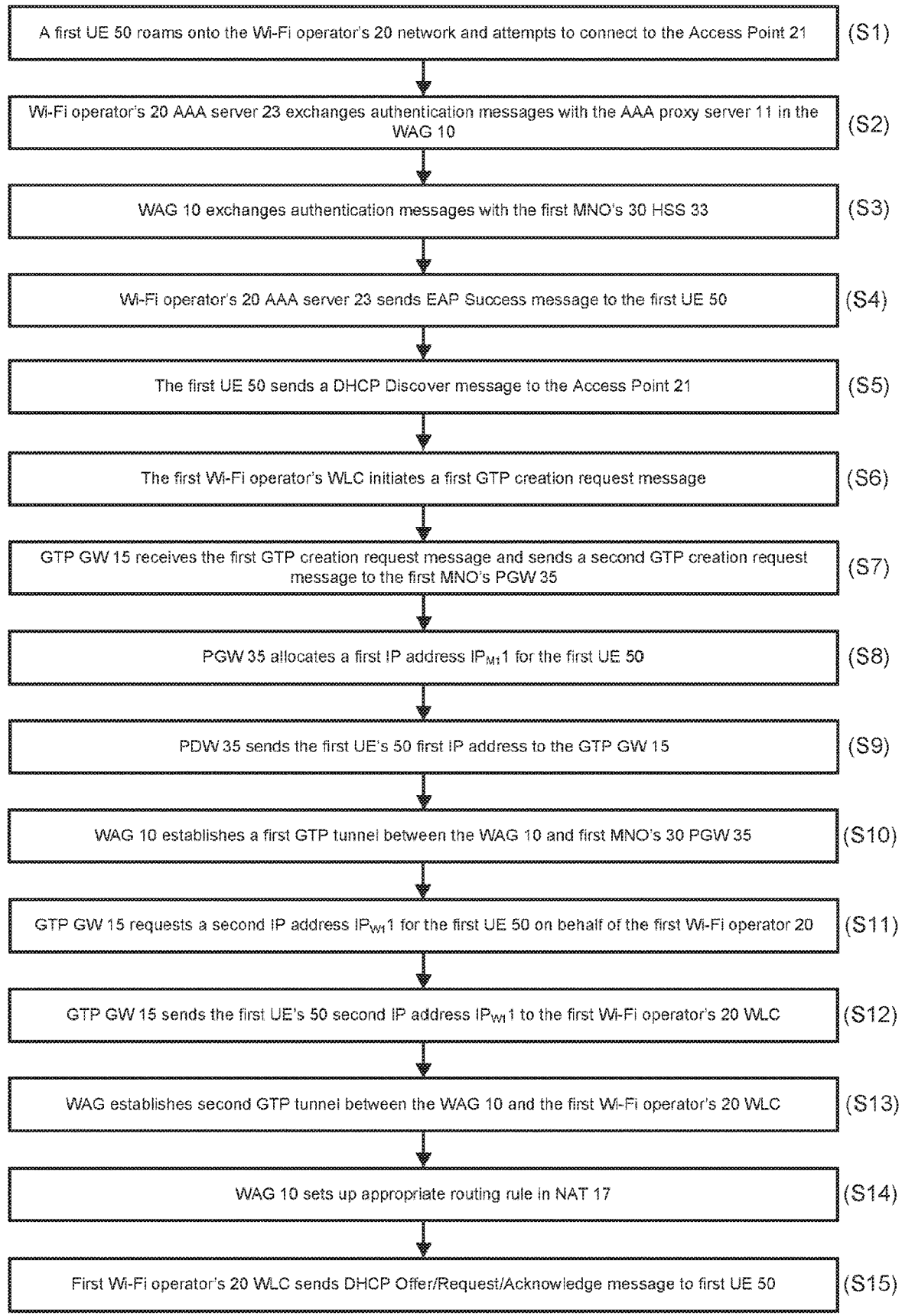
FIG. 3 is a flow diagram illustrating a method of the first embodiment.

FIG. 2 is a diagram illustrating the message flow for the setup of a data path between the first UE 50 and the first MNO 30, and FIG. 3 is a corresponding flow chart. On reviewing the following description, the skilled person will understand that the method applies to the setup of a data path between any UE and any MNO connected to the WAG 10, in a manner that alleviates the IP address issues of the prior art.

As a first task (S1), the first UE 50 roams onto the Wi-Fi operator's 20 network and attempts to connect to the Access Point 21. Accordingly, the first UE 50 sends an 'EAP start' message to the Access Point 21, to initiate SIM based authentication using an Extensible Authentication Protocol, EAP. The Access Point/Wireless LAN Controller 21 delivers the EAP start message to the Wi-Fi operator's 20 AAA server 23 (e.g. via its DSL connection).

In response to receiving the EAP start message, the Wi-Fi operator's 20 AAA server 23 exchanges authentication messages with the AAA proxy server 11 in the WAG 10 (S2). This exchange may use the RADIUS or DIAMETER protocols. In S3, the WAG 10 exchanges authentication messages with the first MNO's 30 HSS 33 (using SS7 MAP, RADIUS or DIAMETER protocols), and, in this embodiment, receives an address for the PGW 35 of the first MNO.

On successful authentication with the first MNO, the Wi-Fi operator's 20 AAA server 23 sends an 'EAP Success' message to the first UE 50 via the Access Point 21 (S4).

The first UE 50 then requests an IP address. In this embodiment, it sends a 'DHCP Discover' message to the Access Point 21, including the MAC address of the first UE 50 (S5). On receipt of this DHCP message 50, the first Wi-Fi operator's WLC initiates a first GTP (GPRS Tunneling Protocol) creation request message, which is sent to the GTP GW 15 in the WAG 10 (S6). The skilled person will understand that the GTP tunnel creation request message will be a CreateSessionRequest in GTPv2 or CreatePDP-Context in GTPv1.

The GTP creation request message includes the International Mobile Subscriber Identity (IMSI) of the user. The WLC retrieves the IMSI from the EAP authentication messages by linking them to the UE's MAC address (in the DHCP Discover message).

In S7, the GTP GW 15 receives the first GTP creation request message, and sends a second GTP creation request message to the first MNO's PGW 35 (using the address obtained during the exchange of authentication messages).

The PGW 35 allocates a first IP address $IP_{M1}1$ for the first UE (S8). This IP address is allocated from an IP address pool (e.g. $IP_{M1}(1 \ldots n)$), by a DHCP exchange with the first MNO's 30 DHCP server 31. The PGW 35 then responds to the GTP tunnel creation request by sending the first UE's 50 first IP address to the GTP GW 15 (S9). A first GTP tunnel is thus established between the WAG 10 and first MNO's 30 PGW 35 (S10), using the tunnel endpoint identifiers.

The GTP GW 15 then requests a second IP address $IP_{w1}1$ for the first UE 50 on behalf of the first Wi-Fi operator 20 (S11). The second IP address is allocated from an IP address pool (e.g. $IP_{w1}(1 \ldots n)$) which, in this embodiment, is dedicated to the first Wi-Fi operator 20, by a DHCP exchange with the WAG's 10 DCHP server 13. The GTP GW 15 is preconfigured with the dedicated IP address pool, which has been sent to the GTP GW 15 by the first Wi-Fi operator 20. The first Wi-Fi operator 20 may therefore define an IP address pool which does not conflict with a range of IP addresses reserved for other UEs on its network (e.g. non-roaming UEs).

The GTP GW 15 then responds to the GTP tunnel create request message (sent by the WLC in S6) by sending the first UE's 50 second IP address $IP_{w1}1$ to the first Wi-Fi operator's 20 WLC (step S12). A second GTP tunnel is thus established between the WAG 10 and the first Wi-Fi operator's 20 WLC (S13), and the WAG 10 sets up the appropriate routing and translation rules between the two tunnel endpoints (S14).

The routing rule also includes a further identifier for the data path between the UE 50 and first MNO 30, which, in this embodiment, is an MNO identifier. Accordingly, in a scenario in which the same IP address is allocated to several UEs by several network operators on one side of the WAG (e.g. several MNOs), but different IP addresses on the other side of the WAG, the WAG may use this further identifier to distinguish between the two data paths.

The first Wi-Fi operator's 20 WLC may then respond to the DHCP Discover message from the UE (from S5), by sending a DHCP Offer/Request/Acknowledge message, including the second IP address $IP_{w1}1$ (S15).

FIG. 1 illustrates a data path between the first UE 50 and PDW 35 (which is connected on to the first PDN 70) created by the method as described above. In this example, the first IP address $IP_{M1}1$ is 10.21.3.45 and the second IP address $IP_{W1}1$ is 192.168.5.23. The WAG 10 therefore creates a routing and translation rule for the first UE 50, including its first IP address (i.e. on the Wi-Fi operator's network), its second IP address (i.e. on the first MNO's network) and a first MNO 50 identifier, e.g. $IP_{w1}1 \Leftrightarrow$ tuple (MNO 1, $IP_{m1}1$). Accordingly, data traffic for the first UE 50 originating at either the first UE 50 or on the first MNO 30 may be routed successfully by the WAG 10 to its destination.

FIG. 1 also illustrates the data path between the second UE 60 and PDW 35 (which is connected to the second PDN 80), which may also be created using the method as described above. In this example, the second UE 60 is allocated IP address 192.168.5.24 in the Wi-Fi operator's 20 domain and IP address 10.21.3.45 in the second MNO's 40 domain. Accordingly, the WAG 10 creates a routing and translation rule for the second UE 60, including its IP address on the Wi-Fi operator's network, its IP address on the second MNO's network and a second MNO 60 identifier, e.g. $IP_{w2}2 \Leftrightarrow$ tuple (MNO 2, $IP_{m2}1$).

The skilled person will understand that there is potentially an IP address conflict in the example shown in FIG. 1. That is, both the first and second UE 50, 60 have been allocated the same IP address by the first and second MNO, respectively. However, the WAG 10 may use the MNO identifiers to differentiate between the two UEs and perform the appropriate routing and address translations. The skilled person will understand that this differentiation may be made for data traffic in the opposing direction (e.g. several Wi-Fi operators allocating the same IP address to several UEs, and one MNO allocating different IP addresses to the UEs), by using the further data path identifier (e.g. the UE's IMSI, GTP tunnel endpoints, etc.).

The above embodiment illustrates how the present disclosure provides an improved WAG and method for controlling traffic between non-cellular and cellular networks. The IP address for the UE in the non-cellular domain is allocated from a pool of dedicated IP addresses. That is, the pool of IP addresses may be specified by the Wi-Fi operator, such that a specific range of IP addresses are reserved for roaming UEs. The Wi-Fi operator may therefore allocate IP addresses outside this range to other UEs on its network (i.e. non-roaming UEs). Accordingly, when a new UE roams onto the network and requests an IP address, the IP address may be allocated from the range reserved for roaming UEs such that there is no conflict with non-roaming UEs.

Furthermore, GTP tunnels are provided between both the WAG and the MNOs and the WAG and the Wi-Fi operator. The WAG may therefore be provided using a Layer 3 architecture, such that conventional Access Points may still be used to provide trusted non-3GPP access, and connect using the preferred GTP protocol (which is commonly used between entities in the 3GPP architecture).

Also, the additional data path identifier may be used to successfully route traffic over the WAG in a scenario in which the same IP address is allocated to several UEs by several network operators on one side of the WAG (e.g. several Wi-Fi operators or several MNOs), but different IP addresses on the other side of the WAG.

Embodiments of the present disclosure may also act as a mobility 'anchor' when a UE roams between two Wi-Fi operator networks, as illustrated in the following second embodiment.

Figure 4:
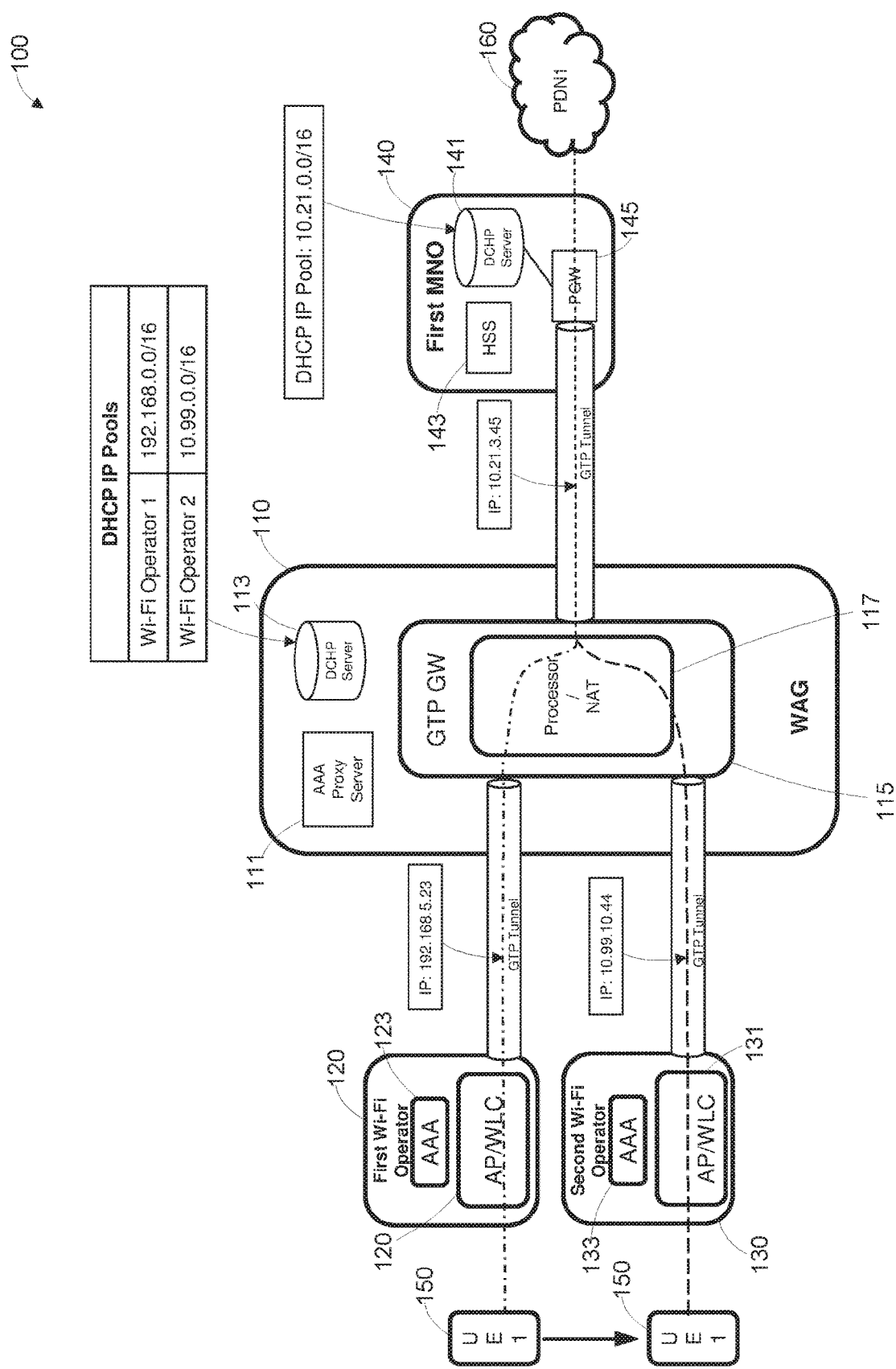
FIG. 4 is a schematic diagram illustrating a wireless network of a second embodiment.

FIG. 4 illustrates a second embodiment of the present disclosure, showing a wireless network 100 including a wireless access gateway (WAG) 110, first and second Wi-Fi operators 120, 130, a first MNO 140, and a first UE 150. Each element is similar to its counterpart in the first embodiment of the present disclosure (i.e. both the first and second Wi-Fi operators 120, 130 are similar to the first Wi-Fi operator 20 of the first embodiment).

Figure 5:
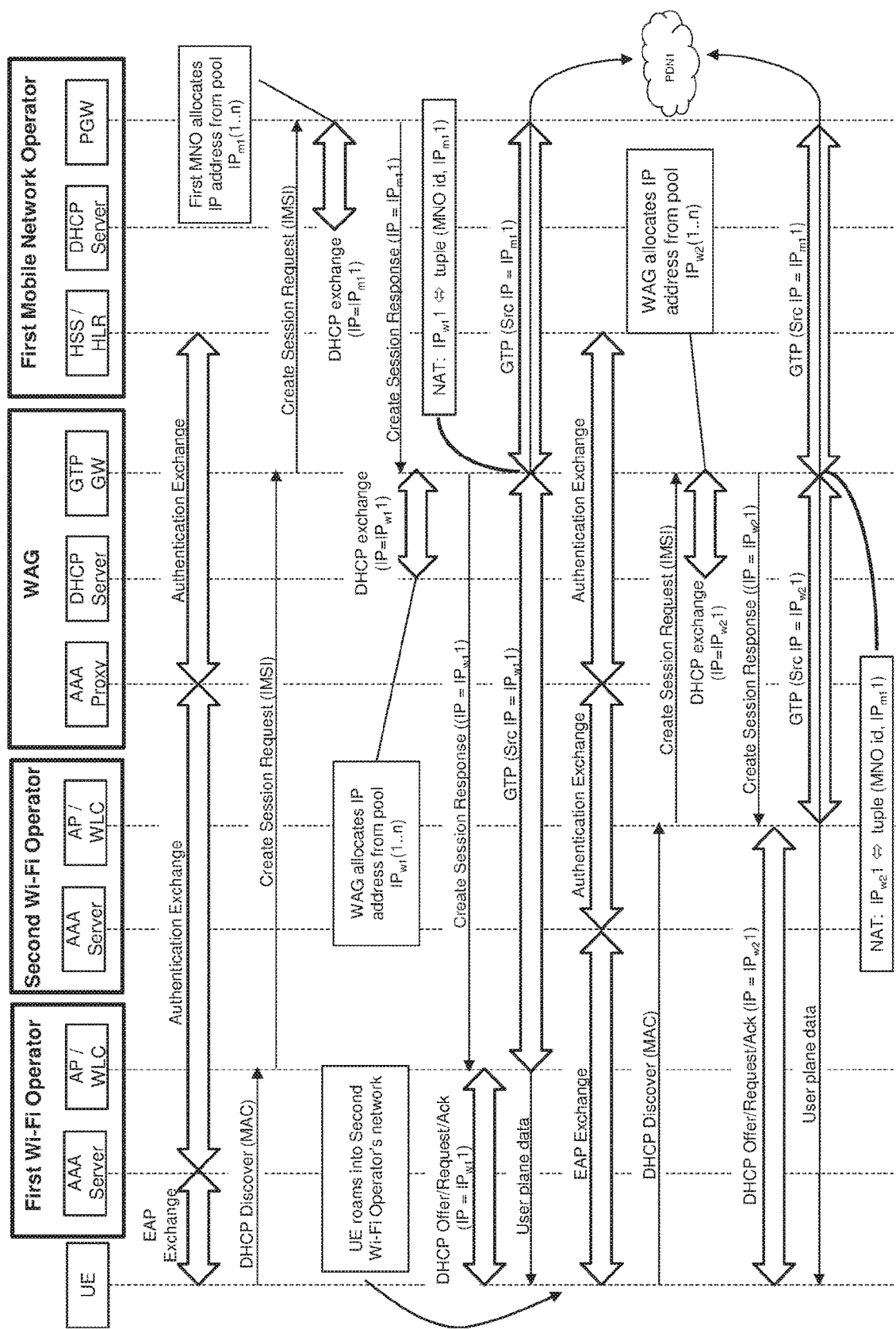
FIG. 5 is a diagram illustrating a message flow between elements of the wireless network of FIG. 4.

In this embodiment, the first UE 50 initially roams onto the first Wi-Fi operator's network 120 and a data path is set up between the first UE 150 and the first MNO 140. Accordingly, the WAG 110 sets up routing and translation rules for the first UE 150. Subsequently, the first UE 150 roams from the first Wi-Fi operator's 120 network to the second Wi-Fi operator's 130 network. In this embodiment, the WAG 110 is configured to maintain the session and IP address on the first MNO's network whilst the first UE 150 attaches to the second Wi-Fi network and is allocated a new IP address. This allows any IP address sensitive applications to continue despite the access network changing. Diagrams illustrating the setup and handover of the first UE 150 are shown in FIGS. 5 and 6.

Figure 6:
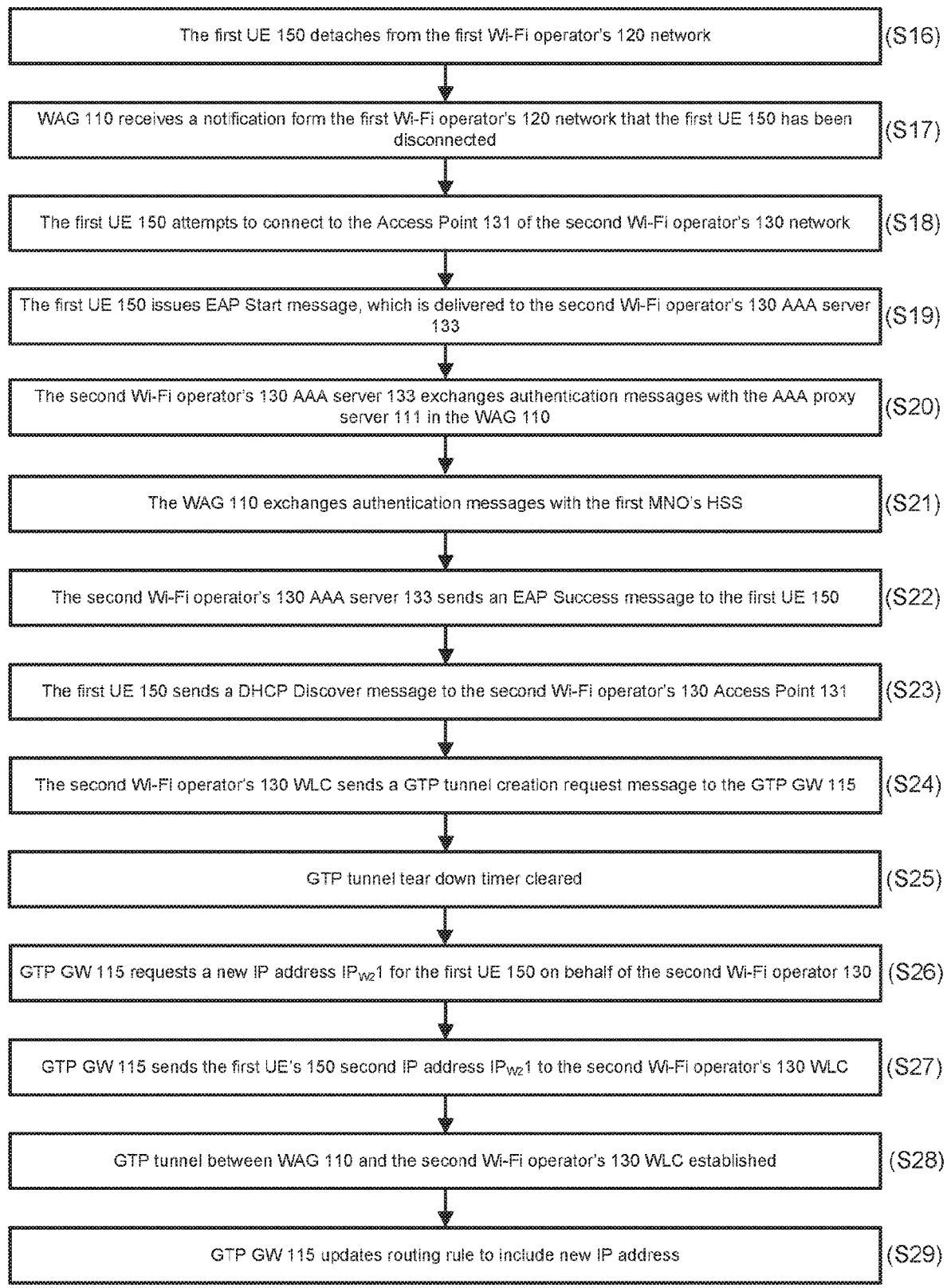
FIG. 6 is a flow diagram illustrating a method of the second embodiment.

The first fifteen tasks (S1 to S15) of FIG. 6 are similar to those shown in FIG. 3 and described in the accompanying description above. For simplicity, the reader should refer to the above description for more detail on these tasks.

At S16, the first UE 150 detaches from the first Wi-Fi operator's 120 network. In this embodiment, the WAG 110 receives a notification from the first Wi-Fi operator's 120 network that the first UE 150 has been disconnected (S17). The WAG 110 does not immediately tear down the GTP tunnel towards the first MNO 140, but instead starts a timer.

The first UE 150 then attempts to connect to the Access Point 131 of the second Wi-Fi operator's network 130 (S18). Accordingly, the first UE 150 issues an EAP Start message to initiate SIM based authentication using EAP, which is delivered to the second Wi-Fi operator's 130 AAA server 133 (S19). The second Wi-Fi operator's 130 AAA server 133 then exchanges authentication messages (using RADIUS or DIAMETER protocols) with the AAA proxy server 111 in the WAG 110 (S20).

In this embodiment, the WAG 110 exchanges authentication messages with the first MNO's HSS using, for example, the SS7, RADIUS or DIAMETER protocols (S21). On successful authentication with the first MNO 140, the second Wi-Fi operator's 130 AAA server 133 sends an EAP Success message to the first UE 150 (S22).

The first UE 150 then sends a DHCP Discover message to the second Wi-Fi operator's 130 Access Point 131 to request a new IP address (S23). On receipt of this DHCP discover message, the second Wi-Fi operator's 130 WLC sends a GTP tunnel creation request (either CreateSessionRequest in GTPv2 or CreatePDPContext in GTPv1) towards the GTP GW 115 of the WAG 110 (S24).

In the second embodiment, the GTP GW 115 receives the GTP tunnel creation request and recognizes that a GTP tunnel has already been established between the WAG 110 and first MNO 140 for the first UE 150 (in S10), and the GTP tunnel tear down timer is cleared (S25).

The GTP GW 115 then requests a new IP address $IP_{w2}1$ for the first UE 150 on behalf of the second Wi-Fi operator 130 (S26). The new IP address is allocated from an IP address pool (e.g. $IP_{w2}(1 \ldots n)$) dedicated to the second Wi-Fi operator 130, by a DHCP exchange with the WAG's 110 DCHP server 113. The GTP GW 115 then responds to the GTP tunnel create request message by sending the first UE's 150 second IP address $IP_{w2}1$ to the second Wi-Fi operator's 130 WLC (S27). A new GTP tunnel is thus established between the WAG 110 and the second Wi-Fi operator's 130 WLC (S28).

In S29, the GTP GW 115 updates the routing and translation rules between the two tunnel endpoints such that traffic will be routed between the new tunnel endpoints (i.e. from the second Wi-Fi operator 140 to the existing GTP tunnel towards the first MNO 140). Thus, a new data path has been established for the first UE 150 between the second Wi-Fi operator 140 and the first MNO 140, without losing the session on the first MNO domain. The WAG 110 therefore acts as a mobility anchor for a UE roaming between two non-cellular networks.

In S21 of the second embodiment, the WAG exchanges authentication messages with the first MNO's HSS. However, in a further enhancement, such an exchange is not necessary. That is, the WAG 110 may receive a plurality of authentication vectors in S1 to S4, and store one or more of these vectors in memory. The WAG 110 may use a stored authentication vector to authenticate the first UE 150 without forwarding messages on to the first MNO 140. Thus, the first MNO 140 does not even need to be informed of the change of access network. The WAG 110 may include a memory to store a plurality of authentication vectors for a plurality of UEs.

In the above embodiments, the WAG initiates a GTP tunnel creation request towards the MNOs PDW. The skilled person will understand that the address of the PDW may be obtained during the authentication phase, or may be statically configured.

Furthermore, in both the first and second embodiments, the UE issues an EAP Start message to initiate SIM based authentication. This method is advantageous as it allows transparent and secure authentication with minimal interaction from the user. Whilst other forms of authentication are possible within the scope of the disclosure (e.g. IEEE 802.1X authentication or portal-based authentication), the EAP-based method above is the most convenient for the user and will therefore promote better utilization of non-3GPP networks and thus more data offloading.

To aid understanding of the disclosure, the description above specifies several protocols which may be used for the exchange of messages between the various elements of the wireless network. However, the skilled person will understand that these are non-essential, such that any appropriate protocol may be used.

Furthermore, whilst the embodiments above illustrate examples of a WAG connecting Wi-Fi operators to MNOs, the skilled person will understand that the WAG may interconnect any form of non-cellular network to any form of cellular network. The WAG may also interconnect any number of non-cellular networks to any number of cellular networks (such as in a one-to-one, one-to-many, or many-to-many relationship).

In the above embodiments, the WAG creates a routing rule mapping the first and second IP addresses and an MNO ID. The MNO ID is used to route traffic between the UE and MNO in a scenario in which several MNOs allocate the same IP address to different UEs. However, the skilled person will understand that any identifier for the data path may be used for this purpose, such as the UE IMSI, or GTP tunnel endpoint IDs.

The description illustrates an example in which the Wi-Fi operator defines a range of IP addresses for roaming devices and sends this to the WAG. The WAG may then allocate an IP address to the UE in the Wi-Fi domain from this range of IP addresses. However, the skilled person will understand that this method of determining the IP address range is just one example, and the WAG may determine the range of IP addresses by a variety of techniques. Furthermore, the task of allocating an IP address to the UE in the Wi-Fi domain from a dedicated range of IP addresses is non-essential. The range of IP addresses may be configured statically when setting up the WAG. Alternatively, the WAG may send a 'DHCPInform' message to a Wi-Fi network operator's network, which may return a subnet mask for non-roamed traffic. The range of IP addresses may be determined from this subnet mask.

Furthermore, the skilled person will understand that the WAG may set up the routing and translation rules in a variety of ways. For example, the WAG may include a NAT module, and the WAG may cause the routing and translation rules to be created in the NAT. Additionally or alternatively, the WAG may include a processor adapted to create the routing and translation rules and perform the routing and IP address translation itself (such as by an Application Level Gateway). The skilled person will also understand that the WAG may route the traffic, whilst another element may perform the translation.

The skilled person will understand that any combination of features is possible within the scope of the disclosure, as claimed.

The invention claimed is:

1. A method of controlling a wireless access gateway (WAG), the WAG interconnecting at least one non-cellular network and at least one cellular network in an at least one-to-many relationship, wherein each non-cellular network allocates IP addresses for use across a domain of the respective non-cellular network and each cellular network allocates IP addresses for use across a domain of the respective cellular network, the method comprising:
a WAG receiving a first IP address for a User Equipment (UE) from a first cellular network, the first IP address being allocated by the first cellular network for use across the domain of the first cellular network;
the WAG allocating a second IP address for the UE and sending the second IP address to a first non-cellular network, the second IP address being different from the first IP address and being for use across the domain of the first non-cellular network; and
the WAG translating between the first and second IP addresses for the UE and based on a data path identifier, wherein the data path identifier uniquely identifies a data path between the UE and the cellular network.

2. A method as claimed in claim 1, wherein the data path identifier is a first cellular network identifier.

3. A method as claimed in claim 1, wherein, before the WAG receives the first IP address for the UE, the method further comprises:
the WAG receiving a GPRS Tunneling Protocol (GTP) request message from the first non-cellular network.

4. A method as claimed in claim 3, further comprising:
establishing a GTP tunnel between the WAG and the first non-cellular network.

5. A method as claimed in claim 1, further comprising, initially:
the WAG sending an authentication message for the UE to the first cellular network; and
the WAG receiving an authentication vector for the UE from the first cellular network.

6. A method as claimed in claim 1, wherein the WAG allocates the second IP address for the UE from a dedicated pool of IP addresses for the first non-cellular network.

7. A method as claimed in claim 5, wherein the WAG interconnects a plurality of non-cellular networks to a cellular network, the method further comprising:
the WAG allocating a third IP address for the UE, the third IP address allocated from an IP address range dedicated to a second non-cellular network;
the WAG sending the third IP address to the second non-cellular network; and
the WAG updating the translating to include the first and third IP addresses for the UE.

8. A method as claimed in claim 7, wherein the WAG receives a plurality of authentication vectors for the UE from the first cellular network, the method further comprising:
storing an authentication vector of the plurality of authentication vectors; and using the stored authentication vector for the UE to authenticate the UE.

9. A method as claimed in claim 1, further comprising: routing traffic according to the translating.

10. A method as claimed in claim 1, wherein the WAG also defines a translation rule including the first and second IP addresses for the UE.

11. A non-transitory computer-readable storage medium comprising computer-executable code which, when executed on a computer, causes the computer to perform the method of claim 1.

12. A device adapted to interconnect at least one non-cellular network and at least one cellular network in an at least one-to-many relationship, wherein each non-cellular network allocates IP addresses for use across a domain of the respective non-cellular network and each cellular network allocates IP addresses for use across a domain of the respective cellular network, the device comprising:
a communications interface adapted to receive a first IP address for a User Equipment (UE) from a first cellular network, the first IP address being allocated by the first cellular network for use across the domain of the first cellular network; and
a processor adapted to allocate a second IP address for the UE, the second IP address being different from the first IP address and being for use across the domain of the first non-cellular network,
wherein the communications interface is further adapted to send the second IP address to the first non-cellular network, and the processor is further adapted to create a translation rule to translate between the first and second IP addresses for the UE based on a data path identifier, wherein the data path identifier uniquely identifies a data path between the UE and the cellular network.

13. A device as claimed in claim 12, wherein the data path identifier is a first cellular network identifier.

14. A device as claimed in claim 12, wherein the communications interface is further adapted to receive a GPRS Tunneling Protocol (GTP) request message from the first non-cellular network.

15. A device as claimed in claim 14, wherein the processor is further adapted to establish a GTP tunnel with the first non-cellular network.

16. A device as claimed in claim 12, wherein the communications interface is adapted to send an authentication message for the UE to the first cellular network and to receive an authentication vector for the UE from the first cellular network.

17. A device as claimed in claim 12, wherein the processor is adapted to allocate the first IP address for the UE from an IP address range dedicated to the first non-cellular network.

18. A device as claimed in claim 16, adapted to interconnect a plurality of non-cellular networks to a cellular network, wherein the processor is further adapted to allocate a third IP address for the UE, the third IP address allocated from an IP address range dedicated to a second non-cellular network, the communications interface is further adapted to send the third IP address to the second non-cellular network, and the processor is adapted to update the translation rule to include the first and third IP addresses for the UE.

19. A device as claimed in claim 18, wherein the communications interface is adapted to receive a plurality of authentication vectors for the UE from the first cellular network, and the device further includes a memory adapted to store an authentication vector of the plurality of authentication vectors, and the processor is further adapted to use the stored authentication vector for the UE to authenticate the UE.

20. A device as claimed in claim 12, wherein the processor is adapted to route traffic according to the translation rule.

21. A device as claimed in claim 12, further comprising a Network Address Translation (NAT), wherein the processor is further adapted to update the NAT with the routing rule and the NAT is adapted to route traffic according to the translation rule.

22. A wireless network comprising:
a device adapted to interconnect at least one non-cellular network and at least one cellular network in an at least one-to-many relationship, wherein each non-cellular network allocates IP addresses for use across a domain of the respective non-cellular network and each cellular network allocates IP addresses for use across a domain of the respective cellular network, the device comprising:
a communications interface adapted to receive a first IP address for a User Equipment (UE) from a first cellular network, the first IP address being allocated by the first cellular network for use across the domain of the first cellular network, and
a processor adapted to allocate a second IP address for the UE, the second IP address being different from the first IP address and being for use across the domain of the first non-cellular network,
wherein the communications interface is further adapted to send the second IP address to the first non-cellular network, and the processor is further adapted to create a translation rule to translate between the first and second IP addresses for the UE based on a data path identifier, wherein the data path identifier uniquely identifies a data path between the UE and the cellular network.

* * * * *

UNITED STATES PATENT AND TRADEMARK OFFICE
CERTIFICATE OF CORRECTION

PATENT NO. : 11,451,489 B2
APPLICATION NO. : 15/121695
DATED : September 20, 2022
INVENTOR(S) : Stephen Johnson et al.

Page 1 of 2

It is certified that error appears in the above-identified patent and that said Letters Patent is hereby corrected as shown below:

On the Title Page

In Column 2, under "OTHER PUBLICATIONS", Line 2, delete "htttp://www.cisco.com/" and insert -- htttp://www.cisco.com/ --, therefor.

Page 2, in Column 2, under "OTHER PUBLICATIONS", Line 5, delete "LUcioles;" and insert -- Lucioles; --, therefor.

Page 2, in Column 2, under "OTHER PUBLICATIONS", Line 34, delete "201580013297.8, ," and insert -- 201580013297.8, --, therefor.

Page 2, in Column 2, under "OTHER PUBLICATIONS", Line 48, delete "Feb. 2, 2018" and insert -- Feb. 2, 2018, --, therefor.

In the Specification

In Column 5, Line 22, delete "PDWs 35" and insert -- PGWs 35 --, therefor.

In Column 6, Line 55, delete "PDW 35" and insert -- PGW 35 --, therefor.

In Column 6, Line 62, delete "MNO 50" and insert -- MNO 30 --, therefor.

In Column 6, Line 67, delete "PDW 35" and insert -- PGW 35 --, therefor.

In Column 7, Line 8, delete "second MNO 60" and insert -- second MNO 40 --, therefor.

In Column 8, Line 59, delete "second Wi-Fi operator 140" and insert -- second Wi-Fi operator 130 --, therefor.

In Column 8, Lines 61-62, delete "second Wi-Fi operator 140" and insert -- second Wi-Fi operator Signed and Sealed this
Eighteenth Day of April, 2023

Katherine Kelly Vidal
*Director of the United States Patent and Trademark Office*

130 --, therefor.

In Column 9, Line 12, delete "PDW" and insert -- PGW --, therefor.

In Column 9, Line 13, delete "PDW" and insert -- PGW --, therefor.